United States Patent
Wypyszynski

(10) Patent No.: US 9,637,238 B2
(45) Date of Patent: May 2, 2017

(54) SYSTEM FOR AIRBOARDING BEHIND AN AIRCRAFT

(71) Applicant: Aaron Wypyszynski, Meridianville, AL (US)

(72) Inventor: Aaron Wypyszynski, Meridianville, AL (US)

(*) Notice: Subject to any disclaimer, the term of this patent is extended or adjusted under 35 U.S.C. 154(b) by 111 days.

(21) Appl. No.: 14/656,648

(22) Filed: Mar. 12, 2015

(65) Prior Publication Data

US 2015/0266573 A1 Sep. 24, 2015

Related U.S. Application Data

(60) Provisional application No. 61/969,102, filed on Mar. 22, 2014.

(51) Int. Cl.
| | |
|---|---|
| *B65D 3/00* | (2006.01) |
| *B65D 47/00* | (2006.01) |
| *B64D 17/80* | (2006.01) |
| *B64D 3/00* | (2006.01) |
| *B64C 39/02* | (2006.01) |
| *B64C 31/028* | (2006.01) |

(52) U.S. Cl.
CPC ............ *B64D 17/80* (2013.01); *B64C 31/028* (2013.01); *B64C 39/026* (2013.01); *B64D 3/00* (2013.01)

(58) Field of Classification Search
CPC ....... B64C 31/00; B64C 31/02; B64C 31/028; B64C 31/0285; B64C 31/032; B64C 39/026; B64D 3/00; B64D 17/80
See application file for complete search history.

(56) References Cited

U.S. PATENT DOCUMENTS

| | | | | |
|---|---|---|---|---|
| 3,102,703 A | * | 9/1963 | Clinkenbeard | B64D 3/00 244/3 |
| 3,154,046 A | * | 10/1964 | McLean | B63B 35/81 440/19 |
| 3,295,792 A | * | 1/1967 | Rollins | B64C 31/02 244/2 |
| 3,352,275 A | * | 11/1967 | Wilson | B63B 35/81 114/252 |
| 4,898,345 A | * | 2/1990 | Clayton | B64D 17/00 114/272 |
| 6,102,760 A | * | 8/2000 | Seigler | B63B 1/322 114/253 |
| 6,769,648 B2 | * | 8/2004 | Klima | B64C 1/00 244/138 R |
| 6,951,322 B2 | * | 10/2005 | Klima | B64C 1/00 244/138 R |
| 8,408,488 B2 | * | 4/2013 | Leaver | B64C 27/20 244/12.2 |
| 2002/0125365 A1 | * | 9/2002 | Urie | A63C 5/00 244/4 A |

* cited by examiner

*Primary Examiner* — Philip J Bonzell
(74) *Attorney, Agent, or Firm* — Tomas Friend

(57) ABSTRACT

A system for airboarding and performing stunts behind an aircraft includes a lifting board, a handle, and a tow rope connected to the board and handle. The lifting board may include landing gear, a binding for securing an operator to the board, tail sections for stabilizing the board during flight, and ailerons for facilitating turns and rolls. The system may include a control system integrated into the handle and board that improves the operator's ability to control the board.

20 Claims, 2 Drawing Sheets

SYSTEM FOR AIRBOARDING BEHIND AN AIRCRAFT

CROSS-REFERENCE TO RELATED APPLICATIONS

The present invention claims the benefit of provisional patent application No. 61/969,102 in accordance with 35 U.S.C. §119(e).

BACKGROUND OF THE INVENTION

The present invention relates generally to wakeboarding like devices. More specifically, the present invention pertains to a wakeboarding-like device, referred to herein as an airboard, which can be used to ride on air behind an aircraft.

Wakeboards are known in the art. These devices are towed in the water behind boats and jet skis and allow users to surf along, and perform various stunts using, the wake created by these watercraft. Conventional wakeboards, however, cannot be used behind aircraft and used to perform stunts in the air. Thus, there is a need for a device that can be used to ride on the air and perform stunts behind an aircraft.

The invention is a hybrid of existing technologies based in recreational watersports and proven aerial recreation.

Tow-behind watersports are well known and accepted recreational activities in the prior art, enjoyed by people worldwide. Water-skiers have been towed behind boats for nearly a century. In the past few decades, the sport has grown in popularity and expanded considerably as new technologies have developed. Inflatable water "tubes" and wakeboards are now commonly used. Other devices have emerged more recently: for example, an inflatable craft that rises off the water to provide the rider a flight experience, such as the Hovering Inflatable Towable Water-Sport Device (U.S. Pat. No. 7,261,607) and the Universal Flying Hawk (U.S. Pat. No. 8,007,337). Despite these advances in maneuverability and ability to lift off the surface, these products are nonetheless limited to operations near the surface of the water.

Flight in the absence of an enclosing structure also has a long history in the prior art, particularly for recreational purposes. Skydiving, for instance, has evolved from its origins as a simple freefall with a parachute. Now, skydivers can experience controlled flight through devices such as the Wing Rig (U.S. Application No. 2012/0143088), also known as wing suit; "skyboarding" with a snowboard type device strapped to ones feet; and even a surfboard-like controlled Skyboard (U.S. Pat. No. 4,898,345). Despite the increased maneuverability permitted by these controlled flight devices, however, they all suffer from at least one major limitation: very short duration of flight. This impediment has been overcome by the Lifting System Intended for Free Falling Persons (U.S. Pat. No. 6,685,135), which adds engines to propel the operator through the sky. However, the maneuverability of this device is restricted due to the design restrictions of the wing and powering device. The device also only allows the operator to lie in the prone position, in order to reduce the drag sufficiently to be propelled by an onboard propulsion system.

Towing as a means of achieving propulsion and/or altitude is a concept well known in the prior art. Gliders have been towed behind aircraft for decades. However, in the case of gliders, the aircraft is primarily towed as a means of achieving altitude. While a few performers have developed a unique form of aerobatics by flying inverted and performing barrel rolls while still on tow, these maneuvers are strictly limited due to the low maneuverability of the high aspect ratio glider.

Lastly, due to limitations imposed by aerodynamic forces and instabilities, the prior art has limited human flight by either providing operators with enclosed spaces to shield them from these aerodynamic forces or by placing them in a prone position. Very few examples enable the operator to fly horizontally while standing vertically, or upright. These examples are typically limited to "daredevil" activities, such as wing walking.

SUMMARY OF THE INVENTION

The present invention addresses this need by providing a system that allows a user to ride through the air and perform various stunts, such as flips and rolls, behind an aircraft. In one embodiment, the system includes a lifting board, a handle, and a tow rope. The lifting board may include landing gear that allows the board to be pulled along the ground during takeoff and landing, a binding that allows a user to be securely attached to the board, tail sections that stabilize the board during flight, and a tow rope attachment point for attaching the tow rope to the board. The handle may be an elongated rod, a T-shaped rod pivotally connected to the board, or an inverted u-shaped rod connected to the board on opposite sides of the tow rope attachment point. The tow rope may be connected to the handle and to the board using the tow rope attachment point.

This invention allows for an operator to be towed on a winged lifting board behind a flight vehicle in a position that allows the operator extreme maneuverability of the craft by means of body position and weight shift. This invention extends the activity of wakeboarding to the third dimension and creates an entirely novel use for aerial vehicles, thereby creating a whole new sport.

DETAILED DESCRIPTION OF THE INVENTION

This invention presents a recreational and exhibition use cross between flying and wakeboarding. The invention expands the recreational capabilities of a boat to an aircraft. It provides a rider (or operator or pilot) the unique ability to surf and carve through the sky in a unique upright position on top of a flying board. This provides the rider with increased maneuverability as well as a unique flight experience not found anywhere else in aviation. The design of the system allows for stable takeoff and landing behind an airborne vehicle such as an airplane. Once airborne, the rider is able to maneuver behind the aircraft to an extent not before seen by items towed behind an aircraft. The invention allows for a new dimension and thrill to aerobatic showcase performances. The towed aerial board takes a new twist on aerodynamics by allowing the operator to stand in an upright position on top of the wing.

Figure 1:
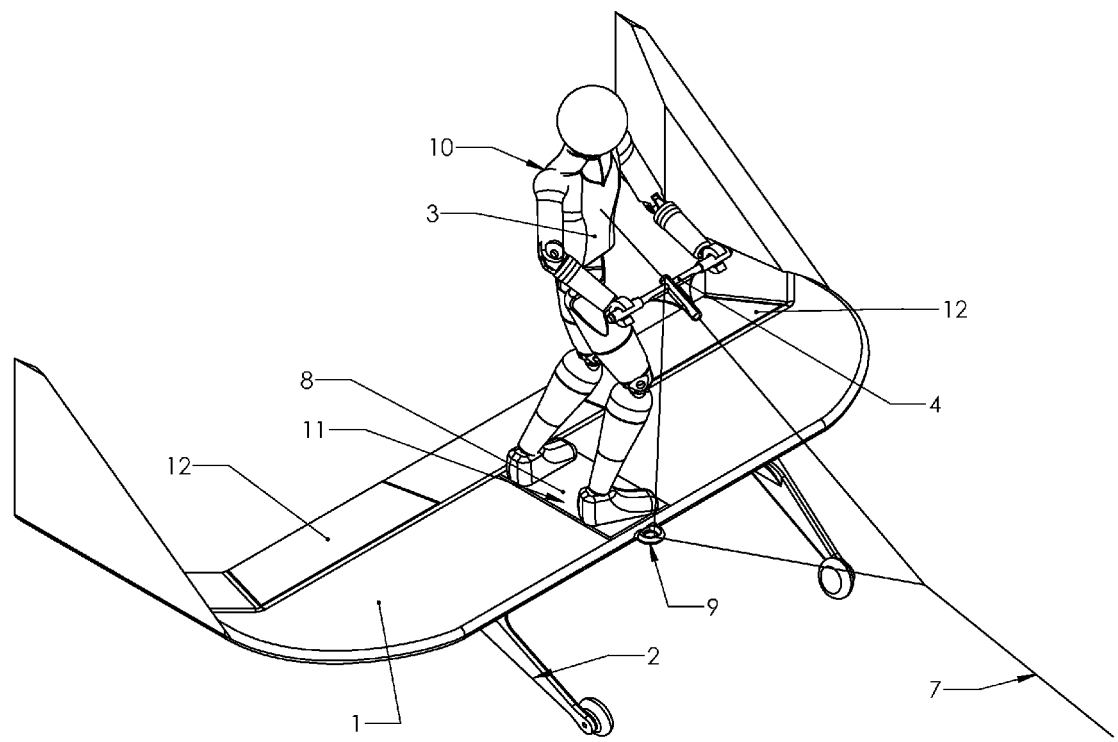
FIG. 1 is a perspective view showing one embodiment of the present invention.
Figure 2:
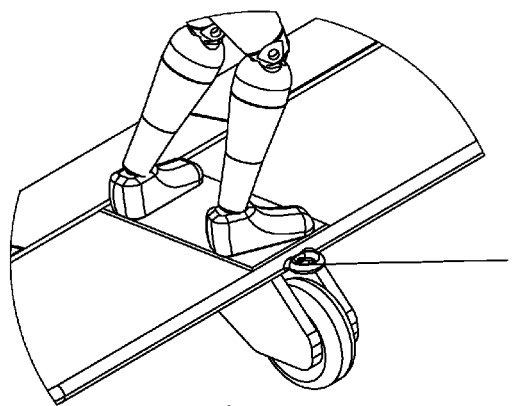
FIG. 2 is an enlarged perspective view showing a second embodiment of the landing gear system.

The main purpose of this invention is to provide an experience similar to wakeboarding or water skiing while being towed behind an airborne vehicle, including airplanes, helicopters, and airships. The main part of the invention is the winged lifting board (the "board"), item 1. This board provides the lift to support the operator. FIG. 1 depicts one embodiment of the invention comprising a board having a single tailless wing. However, the board may comprise multiple aerodynamic surfaces, such as additional wings and tails. Landing gear may be included to allow for rolling takeoff and landings behind vehicles such as an aircraft. One embodiment of such landing gear is depicted as item 2 in FIG. 1. A second embodiment is depicted in FIG. 2.

Figure 3:
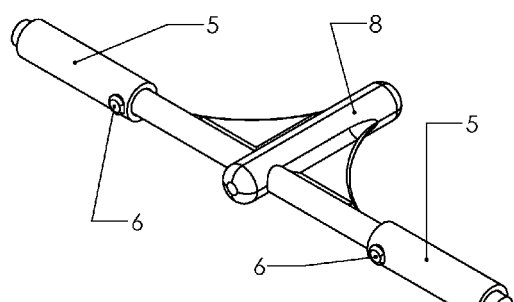
FIG. 3 is an enlarged perspective view showing one embodiment of the control bar.

The operator stands (as shown in FIG. 1. Item 3.), sits, or kneels on top of the wing in a fashion similar to a wakeboard/kneeboard. The operator controls the board by two means. The primary means of control is by weight shift and body location, whereby the operator leans left and right for roll control and rotates the upper torso left and right for yaw control. The operator is also able to change the pitch angle of the board by a combination of leaning forward and/or backward and pulling in and/or extending out the arms that are attached to the control bar (Item 4 and FIG. 3). This is again similar to the controls of a watersports board towed behind a boat. For additional control, control actuation may be employed. The controls may be manipulated by force/rotation sensors mounted on the body or in the board. One such example is a force/load sensor mounted in the foot binding that senses the side-to-side lean of the pilot and actuates roll control devices. Control input may also be employed by the operator by means of a control input devices such as sensors or buttons on the control bar. One such method for roll input may be by means of rotational grips on the control bar (item 5) that actuate the control surfaces. A second embodiment of the control input is by means of button or miniature joysticks (item 6).

The invention also incorporates safety devices to protect the rider. The first line of safety is a shock-absorbing tow rope (item 7), similar to that used in towed water sports, which absorbs shock loads while under tow and prevents the rider from getting jerked off the board. A second line of safety is a fuse link on the tow rope. This fuse link would disconnect the rope under high loads to prevent excessive force from injuring the rider. A manual tow rope release will also be incorporated to allow the rider to disconnect themselves and the board from the tow line by triggering disconnects on the control bar and the board (item 8 and item 9)

The rider is mounted to the board by means of a binding that releases under excessive force or manual actuated release. However, to prevent one leg from releasing before the other, both feet are restrained to a single binding. This binding (FIG. 1 item 8), would release under excessive force or rate of motion, such as in a spin or tumble, in such a method that the whole binding is released from the board with both of the operator's legs attached.

Actuators, either electric, pneumatic, or pyrotechnic control the locking mechanisms on the bindings so that they can be triggered to release manually as well as releasing due to sensed forces and motions.

Riders wear boots similar to those worn by a snow boarder. The boots provide firm support but yet remain flexible to allow the rider some freedom of motion in the ankle joint. The boot restraint is the main structure to which the boot is held to the binding. Straps hold each boot to the binding. The straps are adjustable to fit multiple rider sizes. The straps hold the boot down and back against the boot restraint. The straps are released so that the rider may remove his entire foot and boot from the boot restraint. This is similar to the standard method a snow board boot is strapped to a snowboard. A second embodiment of the rider attachment replaces the boot worn by the rider with an attachment system similar to a wakeboard in which the boot is attached to the binding and the rider slides their foot into the flexible boot already attached to the binding.

The binding is a stiff board to which both boots are held. The shape of the binding is designed to fit into a recess on the wing structure and is retained by the release mechanisms. The Binding also serves as the cover for the wingboard mounted parachute.

In addition to the automatic release, a manual release is also possible. The manual release is actuated by a button on the control bar, such as item 6. In addition to the button on the control bar, a button or trigger may also be incorporated. Remote actuation of the manual release may also be triggered via wireless control.

In one embodiment of the invention, automatic parachute deployment may be incorporated. Once this feature is activated by the operator (or rider or pilot), any one of several events will trigger an automated parachute deployment. The primary parachute is worn by the operator (item 10), similar to a standard skydiving parachute. The board also has its own parachute (item 11) located under the binding. The operator's parachute is activated whenever the tow connection is disconnected (with the exception of a manual release). In one embodiment, this may be achieved by a conductive cable that stretches the entire length of the tow rope. If this conductive path is broken due to release from the tow vehicle at any point, it will trigger the operator's parachute. The operator's parachute and board parachute will automatically deploy any time the board separates from the operator. This will also trigger the release of the tow rope. The release of both the board and tow rope may also be armed and triggered by sensors onboard the operator or board that use a combination of flight conditions, sensed speeds, and rotation rates and accelerations.

This invention may employ any or all of several methods to provide a stable flight for the operator. Passive means, primarily the aerodynamic design of the board, provide the primary means of stability. The board will be designed so that it will remain pointed into the wind on a stable flight path, even in the absence of inputs by the operator. The aerodynamics will also take into account the forces imparted on the board by the tow rope in order to eliminate any unstable oscillations caused by the aerodynamic force-tow rope interactions.

Figure 5:
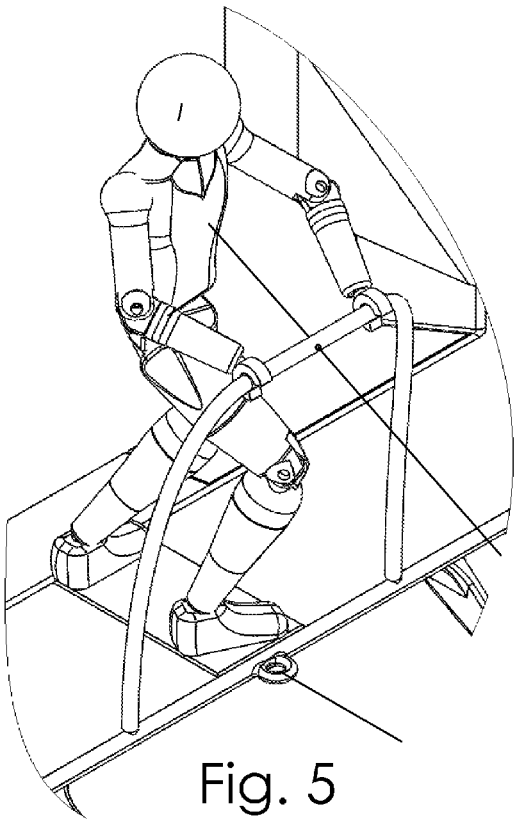
FIG. 5 is an enlarged perspective view showing a third embodiment of the control bar used with the present invention.
Figure 4:
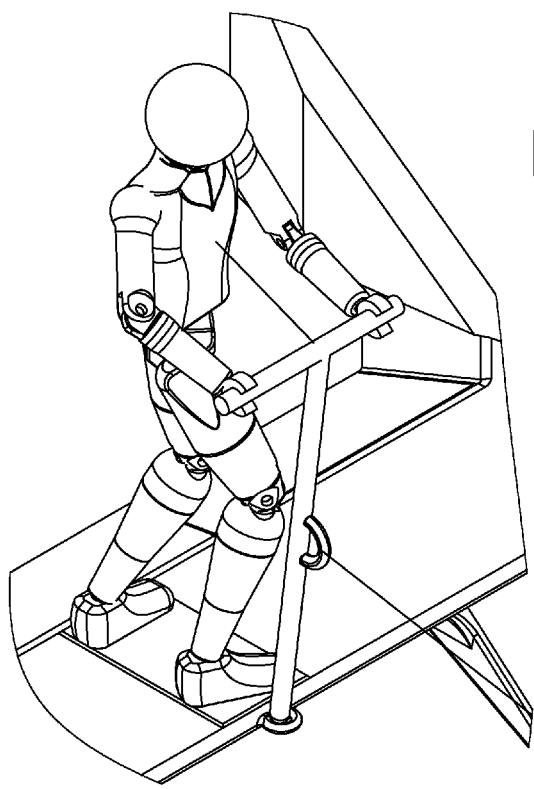
FIG. 4 is an enlarged perspective view showing a second embodiment of the control bar used with the present invention.

Another unique means of stability for this invention is the method in which the tow rope is attached to the board and pilot. The kinematics of the tow rope-board-pilot system determine one or more tow rope attachment points that will automatically stabilize the board as well as limiting the board's ability to reach unstable flight regimes; in one embodiment, these attachment points can be adjusted based on operator size and ability level. This design also allows the pilot to relax and assume a natural position, which will automatically result in stabilized flight. FIG. 1 depicts one embodiment of a twin attachment point: the first attachment is at the board while the second attachment is at the tow bar held by the operator. An additional attachment may be from the tow bar to a harness worn by operator to relieve the forces on the operator's arms, similar to the attachment of a kiteboard kite to its operator. In this configuration, the pitch is limited to maintain stable flight. Also, if the operator relaxes to a standing position, the board will automatically return to a stable flight in a known location behind the towing vehicle. FIGS. 4 and 5 show alternate configurations for the invention, in which a bar connected to the board is grasped by the operator via a rigid attachment, allowing the operator additional support. The bar may be either rigidly or flexibly attached to the board. In all embodiments, both the board and the operator are attached to the towing vehicle, minimizing the forces exerted on the operator. A single attachment point may be used if that attachment point is connected to a device, such as the control bar in FIG. 5, which serves as the connection between the tow line, board, and operator.

Active stability may also be provided to enable easier control as well as help ensure stable flight, particularly for novice operators. The stability would be computer controlled to maintain specific flight angles and rotation rates based on operator input. Control inputs may be provided by devices such as gyros, flow control, and control surfaces. One example is shown in item 12, in which ailerons, one on each side of the trailing edge of the board, would be used to provide roll control. In this example, a flight computer would be used to maintain the operator in an upright position. Inputs from the operator would then be read by the flight computer and the ailerons would be actuated to maintain a specified roll angle or rate. These active stability devices may also be used to increase the maneuverability of the board.

All embodiments of the invention are scalable to meet the needs of a particular operator's size, physique, and/or ability level. In addition, the board size and shape may be of different configuration to account for different flight regimes and maneuverability. For example, smaller boards may be used for higher speed flight or smaller riders. A larger board may be employed for heavier riders or slower flight. The board shape and configuration may also be modified to allow for different levels of maneuverability, just as different sizes of surfboards and wakeboards are used for riders with various levels of experience. A larger, more stable board may be used for novices, whereas a smaller less stable, or even unstable, board may be used for advanced riders.

The above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:

1. An airborne towed lifting board comprising:
   a wing;
   a binding for securely attaching an operator onto the lifting board, said binding being releasable from the lifting board in response to a force or a rotational speed;
   a first tow rope attachment point; and
   wherein the tow rope attachment point comprises a mechanism for manually releasing a tow rope and a mechanism for automatic release of the tow rope.

2. The lifting board according to claim 1, further comprising landing gear.

3. The lifting board according to claim 1, wherein said first tow rope attachment point is on a leading edge of the wing and the lifting board further comprises a second tow rope attachment point positioned to limit the pitch of the wing during flight.

4. The lifting board of claim 1, further comprising winglets.

5. The lifting board according to claim 1, further comprising a parachute mounted to the lifting board and configured to deploy automatically and/or manually.

6. The lifting board of claim 5, wherein:
   the parachute, when not deployed, is housed in a compartment of the lifting board and
   said compartment is covered by the binding and wherein the parachute is configured to deploy automatically when the the binding releases from the lifting board.

7. The lifting board according to claim 1, further comprising a control bar attached to the lifting board.

8. The lifting board according to claim 7, wherein said first tow rope attachment point is on a leading edge of the wing and the lifting board further comprises a second tow rope attachment point on the control bar.

9. The lifting board according to claim 1, further comprising a force/load sensor mounted in a foot binding on the lifting board or on a control bar attached to the lifting board.

10. The lifting board according to claim 9, further comprising a parachute and wherein said force/load sensor is configured to automatically release a tow rope and/or said parachute in response to a sensed speed, a sensed rotation rate and/or an acceleration.

11. An airboarding system, said system comprising the lifting board of claim 1 and a sensor configured for attachment to the operator, said sensor configured to trigger the release of a tow rope when the sensor detects a combination of a sensed speed, a sensed rotation rate, and/or a sensed acceleration.

12. The airboarding system of claim 11, wherein the lifting board comprises a control bar attached to the lifting board and wherein the lifting board comprises a tow rope attachment point on a leading edge of the wing and a tow rope attachment point on the control bar.

13. The airboarding system of claim 12, wherein the control bar comprises a handle, and wherein:
   the handle comprises a rod having tow rope attachment points on opposite ends of the rod; or
   the handle is a T-shaped bar pivotally connected to a center portion of the lifting board; or
   the handle is an inverted u-shaped rod connected to the upper surface of the lifting board and comprises a tow rope connection point on a center portion of the handle.

14. The airboarding system of claim 11, and further comprising a tow rope and wherein the tow rope comprises a fuse link.

15. The airboarding system of claim 14, wherein the tow rope is Y-shaped tow and the lifting board comprises two rope attachment points.

16. The airboarding system of claim 14, wherein the tow rope comprises a cable with a conductive path that, when broken, triggers deployment of a parachute worn by the operator.

17. The lifting board of claim 1, further comprising an aileron one on each side of a trailing edge of the board.

18. The lifting board of claim 17, further comprising a control bar attached to the lifting board and wherein said control bar comprises rotational grips that actuate the ailerons.

19. An airboarding system comprising a towable winged lifting board allowing an operator to stand, kneel, or sit on top of the board while in flight, said air boarding system comprising:
- a wing;
- a control bar attached to the lifting board;
- a first parachute attached to the lifting board;
- a second parachute to be worn by the operator;
- a binding system for attaching the operator to the board, said binding system being configured to release the operator from the lifting board in the event of excessive force or rotation rates;
- a tow rope connection point configured to release a tow rope in response to excessive force or an actuation by the operator; and
- wherein the first and second parachutes deploy automatically when the tow rope and/or the operator is released from the lifting board.

20. The airboarding system of claim 19, wherein
- a pair of wheels is connected to a lower surface of the lifting board,
- the binding system is connected to an upper surface of the lifting board,
- the first parachute is positioned between the binding system and the lifting board, and
- the tow rope attachment point extends outward from a center front edge of the lifting board.

* * * * *